US009590964B1

United States Patent
Bortz et al.

(10) Patent No.: US 9,590,964 B1
(45) Date of Patent: Mar. 7, 2017

(54) GPS-ENABLED CROSS-DOMAIN GUARD

(75) Inventors: Mark A. Bortz, Robins, IA (US); Sung J. Kim, Cedar Rapids, IA (US); T. Douglas Hiratzka, Coralville, IA (US); Andrew J. LeVake, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 446 days.

(21) Appl. No.: 12/880,479

(22) Filed: Sep. 13, 2010

Related U.S. Application Data

(63) Continuation-in-part of application No. 11/820,351, filed on Jun. 19, 2007, which is a continuation-in-part of application No. 11/366,136, filed on Mar. 2, 2006, now Pat. No. 7,606,254.

(51) Int. Cl.
  *H04L 29/06* (2006.01)
(52) U.S. Cl.
  CPC .............. *H04L 63/08* (2013.01); *H04L 63/20* (2013.01); *H04L 63/101* (2013.01)
(58) Field of Classification Search
  CPC ........ H04L 63/08; H04L 63/101; H04L 63/20
  USPC ......................................................... 726/1–3
  See application file for complete search history.

(56) References Cited

U.S. PATENT DOCUMENTS

| | | | | |
|---|---|---|---|---|
| 6,009,116 | A * | 12/1999 | Bednarek et al. | 375/130 |
| 6,108,365 | A * | 8/2000 | Rubin et al. | 375/130 |
| 2002/0040388 | A1* | 4/2002 | Ternullo et al. | 709/218 |
| 2002/0161680 | A1* | 10/2002 | Tarnoff | 705/35 |
| 2003/0163684 | A1* | 8/2003 | Fransdonk | 713/153 |
| 2004/0059909 | A1* | 3/2004 | Le Pennec et al. | 713/153 |
| 2004/0210663 | A1* | 10/2004 | Phillips et al. | 709/230 |

OTHER PUBLICATIONS

Nancy Welsh, "Rockwell Collins Receives MILS Certification from NSA on Microprocessor", Aug. 24, 2005.*

* cited by examiner

*Primary Examiner* — John B King
(74) *Attorney, Agent, or Firm* — Angel N. Gerdzhikov; Donna P. Suchy; Daniel M. Barbieri

(57) ABSTRACT

A method for routing of information between networks of differing security levels may include, but is not limited to: receiving a data packet from a first network having a security classification at a first network node; determining a geographic location of the first network node; applying one or more geographic location-dependent access control rules for the data packet according to the geographic location of the first network node with a guard engine; transferring the data packet to a second network according to compliance of the data packet with the one or more geographic location-dependent access control rules.

13 Claims, 6 Drawing Sheets

GPS-ENABLED CROSS-DOMAIN GUARD

CROSS-REFERENCE TO RELATED APPLICATIONS

The present application is a continuation-in-part application and claims priority under 35 U.S.C. §120 to the U.S. patent application Ser. No. 11/820,351 entitled: High-Assurance Architecture for Routing of Information Between Networks of Differing Security Levels filed Jun. 19, 2007 (pending) which is herein incorporated by reference in its entirety, to the extent such disclosures are not inconsistent herewith. U.S. patent application Ser. No. 11/820,351 is a continuation-in-part application and claims priority under 35 U.S.C. §120 the U.S. patent application Ser. No. 11/366,136 entitled: Evaluatable High-Assurance Guard for Security Applications filed Mar. 2, 2006, (issued as U.S. Pat. No. 7,606,254).

SUMMARY

A method for routing of information between networks of differing security levels may include, but is not limited to: receiving a data packet from a first network having a security classification at a first network node; determining a geographic location of the first network node; applying one or more geographic location-dependent access control rules for the data packet according to the geographic location of the first network node with a guard engine; transferring the data packet to a second network according to compliance of the data packet with the one or more geographic location-dependent access control rules.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

In highly secure computer systems, there is often a need to share information between networks with differing security level. For example, an unclassified network may need to share information with a top-secret network. High-assurance guards may be utilized in highly secure computer systems to interconnect networks of differing security level.

In order to receive the desired "high-assurance" or "trusted" certification from government organizations such as the National Computer Security Center (NCSC), such guards must be subjected to an evaluation program (such as the Trusted Products Evaluation Program (TPEP)) in which they are tested against a comprehensive set of security-related criteria. Guards that interconnect unclassified and top secret networks need to be accredited to protection level 5 (PL5). Further, such evaluation typically requires construction and solution of complex mathematical proofs designed to prove the "correctness" of the guard being evaluated.

During high-assurance certification evaluations, the intrinsic partitioning mechanism of the guard engine 101 may be mathematically proven correct. This may reduce the amount of software which needs to be evaluated to a high Evaluation Assurance Level (EAL). Further, the very nature of the intrinsic partitioning architecture may allow the amount of critical code to be small, since it may be unburdened by complex interprocess communications software that may be found in operating systems for general-purpose microprocessors. Proofs of correctness may proceed from a symbolic simulation of critical code of the present invention utilizing a formal model. An automated theorem prover, such as an ACL2 (A Computational Logic for Applicative Common LISP (List Processing)), may then be utilized to perform detailed proof steps for establishing correctness. Each of the above-referenced factors may promote ease of evaluation when trying to attain high-assurance certification of the present invention by reducing the time and effort needed for evaluation.

Reference will now be made to examples that are illustrated in the accompanying drawings.

Figure 1:
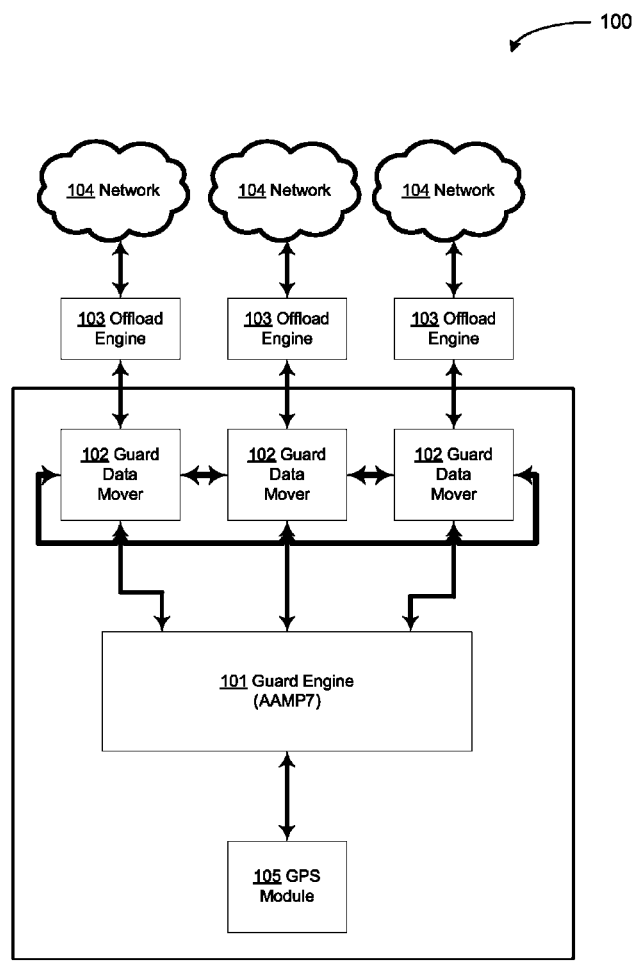
FIG. 1 is a block diagram of a device for routing information between networks of differing security level, in accordance with an exemplary embodiment of the present invention.

FIG. 1 illustrates a block diagram of a device 100 for routing information between networks of differing security level, in accordance with an exemplary embodiment of the present invention. The device 100 enforces a security policy on a data flow. As shown, the device 100 may be capable of connecting to three different networks 104. However, the device 100 may be capable of connecting to different numbers of different networks 104 without departing from the scope of the present invention. Communication to and from each network 104 may be handled by a dedicated Offload Engine (OE) 103. Each Offload Engine 103 may include an interface for connecting to an external network 104. The interface may include, but is not limited to a 10/100 Ethernet interface and a RS232 interface. Each OE 103 interfaces to a Guard Engine 101 through a Guard Data Mover (GDM) 102.

Each OE may include an operating system (including, but not limited to, Linux, Unix, Windows, and Mac OS) which includes drivers for the GDM and a watchdog unit hosted on an embedded processor including, but not limited to, an ARM processor (a 32-bit RISC (reduced instruction set computer) processor developed by ARM Limited and utilized in a number of embedded designs).

The watchdog unit may perform health monitoring functions which must be written to within a prescribed window of time, otherwise an error is generated and handled by the Guard Engine software.

A TCP/IP stack may be provided with an interface to an Ethernet MAC (media access control) device. The Guard Engine may be based on any microprocessor running a MILS certified operating system. Particularly, the Guard Engine may be based on an AAMP7 (Advanced Architecture MicroProcessor 7) microprocessor (a microprocessor with an intrinsic partitioning architecture developed by Rockwell Collins and designed for use in embedded systems). The GDM comprises a FPGA (field programmable gate array) based engine that provides independent data channels that allow the Guard Engine and OEs to communicate in a high-assurance manner.

A first OE 103 receives a data packet from a first network 104 intended to be transmitted to a second network 104. The data packet may be intended to be transmitted to a second network 104 if a header of the data packet specifies the second network 104 as a destination for the data packet. The Guard Engine 101 analyzes the data packet. The Guard Engine 101 may include an access control list (ACL) which includes rules that data packets must meet before being passed on to a destination network. If allowed by the ACL, the Guard Engine 101 delivers the data packet to the second network 104 via a second OE 103 utilizing a GDM 102 associated with the first OE 103 and a GDM associated with the second OE 103. The Guard Engine 101 may generate an audit record. The audit record may include, but is not limited to, health status of the OEs 103 and the Guard Engine 101 and failed data packet transmission attempts. The Guard Engine 101 may deliver the audit record to the first network 104 via the first GDM 102 and the first OE 103, the second network 104 via the second GDM 102 and the second OE 103, or a third network 104 (which may be an audit network) via a third GDM 102 and a third OE 103.

A data packet may be defined as a fundamental unit of information carriage in all modern computer networks that implement packet switching. For instance, the data packet may include a header, which contains information that may be used to forward the data packet from its source to its destination. Further, the data packet may include a data area which contains information about a user who caused the creation of the data packet. Additionally, the data packet may include a trailer which may contain techniques for ensuring that errors do not occur during data transmission.

The Guard Engine 101 May Further Comprise an Integrated GPS Module 105

Figure 2:
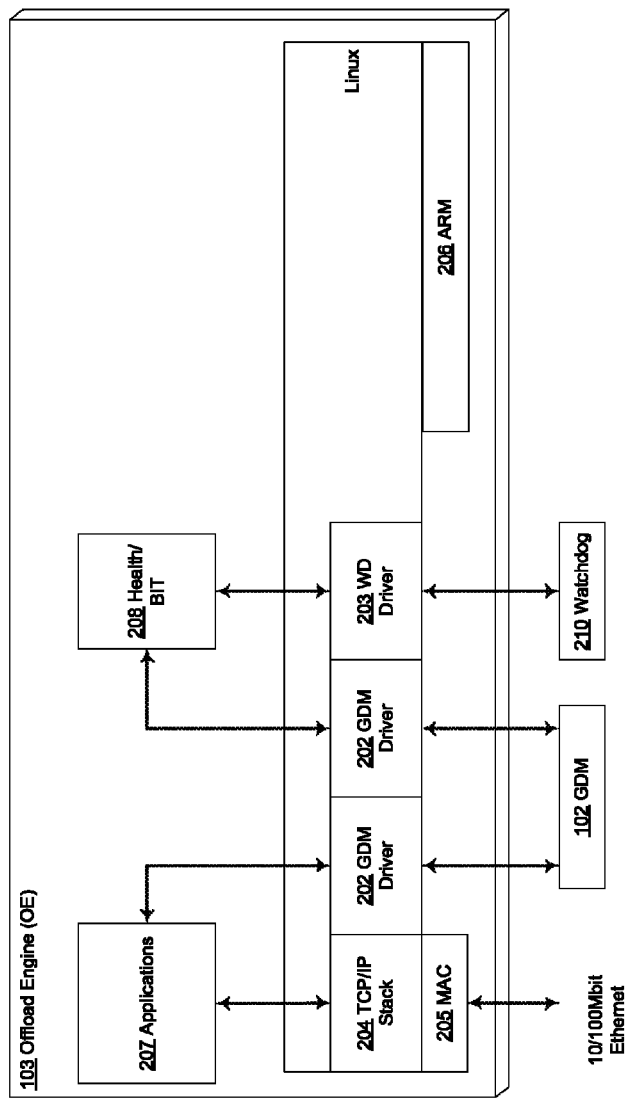
FIG. 2 is a block diagram of an Offload Engine, in accordance with an exemplary embodiment of the present invention.

Referring to FIG. 2, each OE 200 may consist of a Linux operating system 201 which includes drivers 202 and 203 for the GDM 209 and a watchdog unit 210. A TCP/IP stack 204 may be provided with an interface to a 10/100 Mbit Ethernet MAC (media access control) device 205. The OE software may be hosted on an ARM processor (a 32-bit RISC (reduced instruction set computer) processor utilized in a number of embedded designs) 206. Executing on the Linux operating system may be both the system integrator supplied applications 207 and a health monitoring and Built In Test (BIT) application 208. The system integrator applications 207 and any data associated with them are referred to as "configuration data."

The Guard Engine 101 may be based on the AAMP7 (Advanced Architecture MicroProcessor 7) microprocessor (a microprocessor with an intrinsic partitioning architecture designed for use in embedded systems). The intrinsic partitioning, the NSA (National Security Agency) MILS (Multiple Independent Levels of Security) certification of the AAMP7G (Advanced Architecture MicroProcessor 7 Government Version), and formally analyzed software provide a high-assurance computing core for the enforcement of a security policy. Intrinsic partitioning is an architectural feature of the AAMP7 which allows the integration of multiple applications in a way that allows for their assured separation. Partitions are processing contexts where communication between partitions may be limited to what is allowed by an information flow policy. A partitioned system may be capable of supporting MILS integration of multiple secured applications into a single embedded system. The intrinsic partitioning mechanism may operate as a separation kernel implemented in microcode. Rather than managing operating system tasks, however, the intrinsic partitioning mechanism may maintain appropriate separation between a set of system partitions implemented directly in the microarchitecture and associated microcode. The AAMP7 is designed to enforce a communication policy between partitions that ensures that improper communication is not allowed, thereby providing a system designer a useful and dependable building block for designing and implementing secure systems.

A system has intrinsic partitioning if it is designed from the ground up to enforce this kind of brick wall separation. Intrinsic partitioning, such as that natively supported by the AAMP7 microprocessor, provides absolute assurance of the spatial and temporal separation between partitions. The underlying processing platform enforces a policy of information flow between partitions with mechanisms that are designed into the machine itself, not added later at the operating system or application levels. This approach results in a simpler separation mechanism, reflecting the fact that the myriad implementation details that need to be verified to ensure security of the system are typically low-level considerations. These considerations include whether all user instructions adhere to memory protection policies, whether a user partition can deny processing to other partitions, whether caches are shared between partitions, and other low-level details that are crucial for security. To ensure that highly sensitive data can be securely mixed with data and programs at lower or unclassified levels requires a separation mechanism that is best implemented and certified at a low level of the design.

Figure 3:
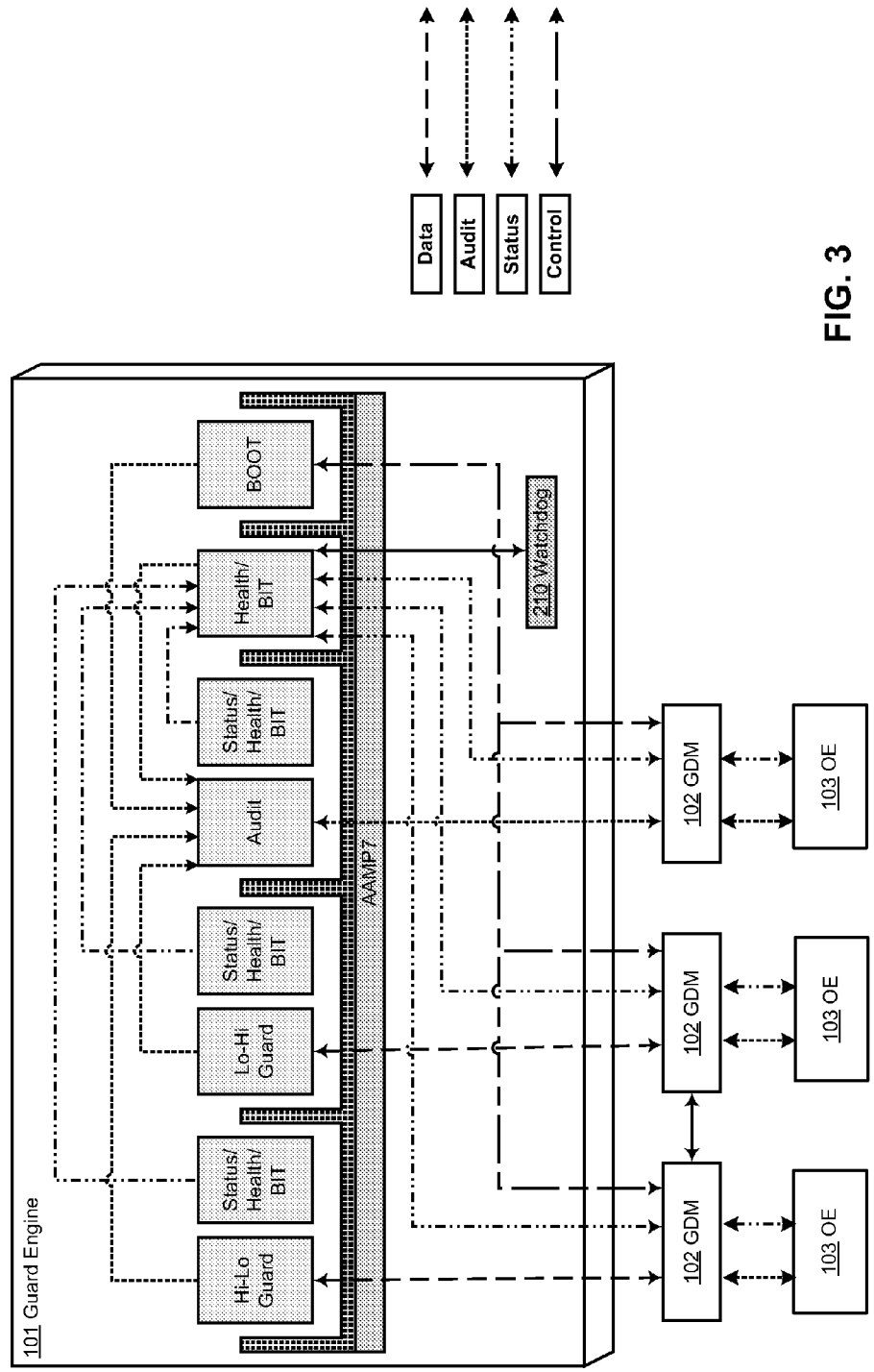
FIG. 3 is a block diagram illustrating the interaction between the Guard Engine hardware and software, in accordance with an exemplary embodiment of the present invention.

Referring to FIG. 3, the interaction 300 between the Guard Engine 101 hardware and software is illustrated. As illustrated, the Guard Engine 101 may interact with three GDMs. However, the Guard Engine 101 may be capable of interacting with different numbers of GDMs without departing from the scope of the present invention. The present invention may rely on intrinsic partitioning to enforce which applications are allowed to configure hardware, review messages and approve their transmission through the guard, and finally to manage health and audit functions. The separation provided by intrinsic partitioning may help simplify analysis of the various functions of the present invention.

The GDM 102 may comprise a FPGA (field programmable gate array) based engine that provides independent data channels that allow the Guard Engine 101 and OEs 103 to communicate in a high-assurance manner. The GDM 102 may facilitate four main functions/data paths. However, the GDM 102 may include different numbers of functions/data paths without departing from the scope of the present invention. The first function may be to act as an accelerator to move data between networks of differing levels of security under direction of the Guard Engine 101. This may provide a significant performance boost by alleviating the need for the Guard Engine 101 to move every byte of a data message to an intended OE 103. A GDM 102 may not make independent decisions to move data. Rather, the GDM 102 may rely on the Guard Engine 101 to analyze the message and initiate the transfer. The second function of a GDM 102 may be to provide a separate data path for the OEs 103 to pass health a BIT status messages to the Guard Engine 101. This data path may be unidirectional so that data can only flow into the Guard Engine 101. The third function may provide a data path for the Guard Engine to pass control messages to the OE 103. This data path may be unidirectional so that control can only flow from the Guard Engine 101 to the OE 103. The fourth function may be to provide an interface for the Guard Engine 101 to pass audit messages to the OE 103. Audit data may be defined as system-generated data which corresponds directly to recorded actions taken by identifiable and authenticated users. This interface may be unidirectional so that the audit messages can flow only from the Guard Engine 101 to the OE 103.

Figure 4:
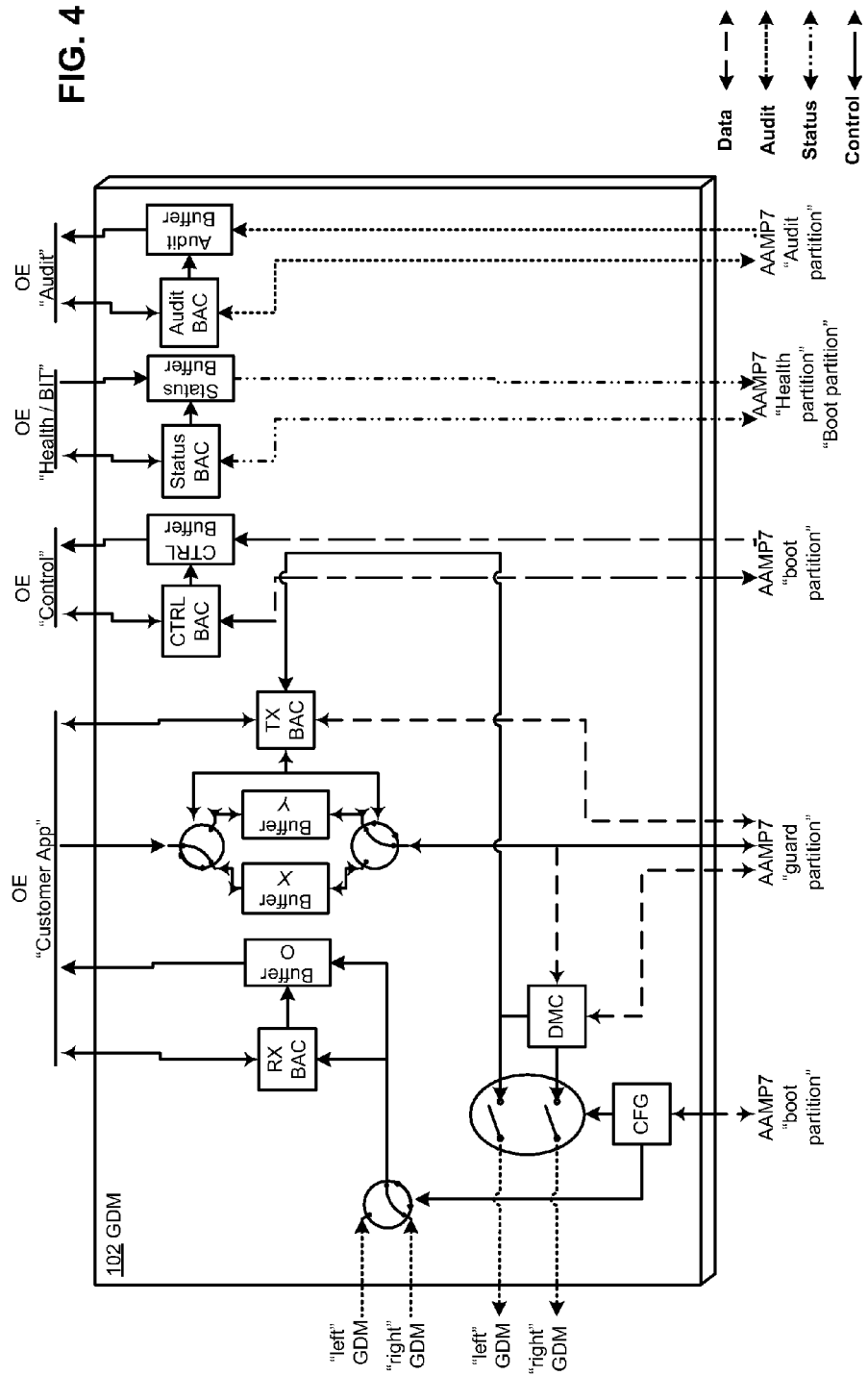
FIG. 4 is a block diagram illustrating high-level interactions between a Guard Engine software, OE software, and a GDM, in accordance with an exemplary embodiment of the present invention.

FIG. 4 illustrates the high-level interactions between the Guard Engine 101 software, OE 103 software, and the GDM 102.

Figure 5:
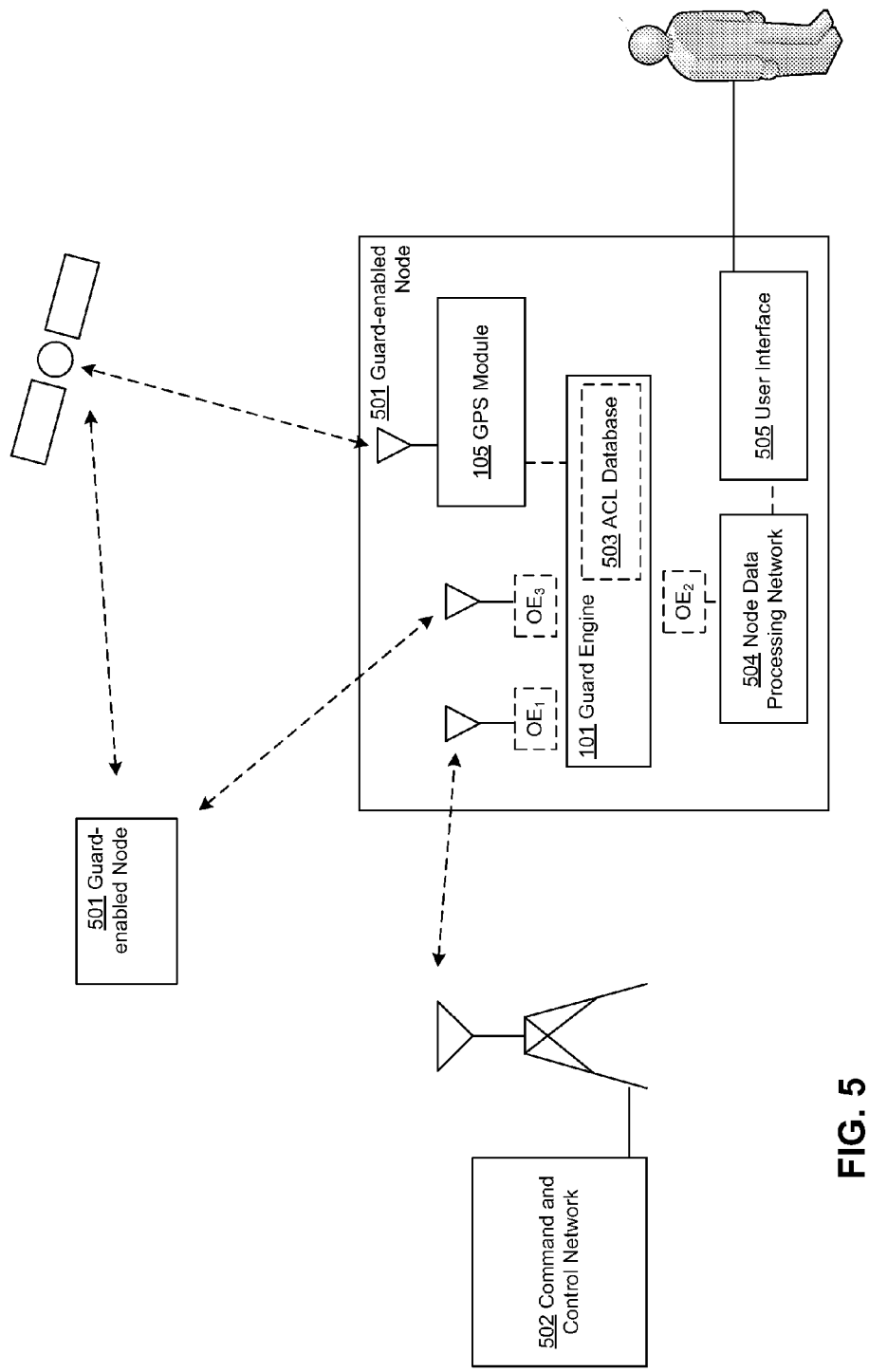
FIG. 5 is a block diagram illustrating a system employing the Guard Engine.

FIG. 5 illustrates a system 500 including one or more devices employing a Guard Engine 101, as described above. The system 500 may include at least one guard-enabled device 501 and a classified command and control network 502. The guard-enabled device 501 may employ the guard engine 101 to execute various data transfer operations.

The guard-enabled node 501 may be configured for receiving a data packet from a first network having a security classification at a first network node. For example, the guard-enabled node 501 (e.g. a tactical mobile device) may receive data from the command and control network 502 (e.g. a command and control center) having a given security classification (e.g. "top secret") such that access to that data should be limited only to systems associated with users having a given security clearance. The data may be received at a first offload engine (e.g. $OE_1$).

The guard-enabled node 501 may be further configured for determining a geographic location of the first network node. For example, the guard-enabled node 501 may include a GPS module configured to determine the geographic location of the guard-enabled node 501. The GPS module may receive GPS signals from GPS satellites, compute the location of the guard-enabled node 501, and report this location to the guard engine 101.

Figure 6:
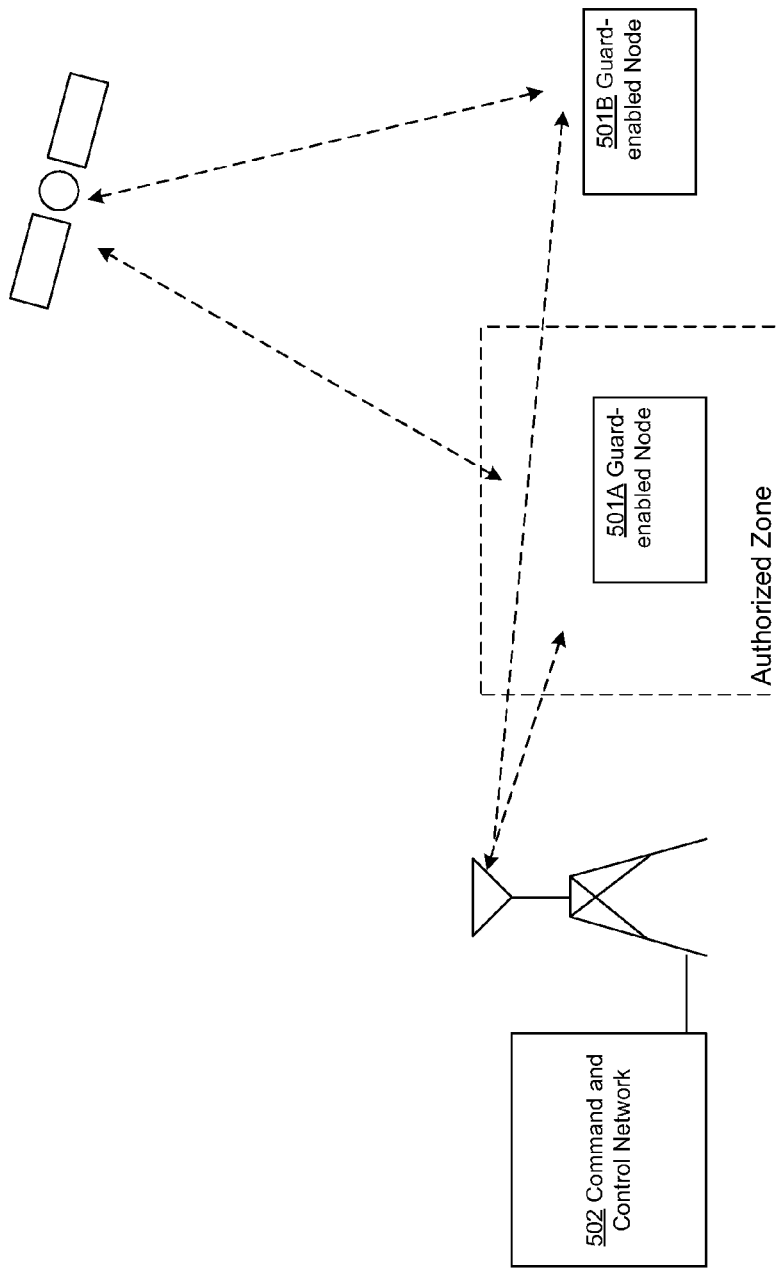
FIG. 6 is a block diagram illustrating a system employing the Guard Engine.

The guard-enabled node 501 may be further configured for applying one or more geographic location-dependent access control rules for the data packet according to the geographic location of the first network node with a guard engine. For example, a data packet received from the command and control network 502 may contain identifying meta-data (e.g. a header) defining the security level of the data packet. The guard engine 101 may receive the location data from the GPS module and apply a location-dependent access control rule (ACR) from the ACL database 503 to the data packet. For example, an ACR may dictate that data packets having an associated level of security (e.g. "top secret") may only be provided to a user of guard-enabled node 501 when the guard-enabled node 501 is in a certain location. Referring to FIG. 6, guard-enabled node 501A is determined to be within an authorized zone while guard-enabled node 501B is outside the authorized zone. As such, the guard engine 101 of guard-enabled node 501A will allow access to a data packet having an associated level of security while the guard engine 101 of guard-enabled node 501B will restrict access to the data packet.

Referring again to FIG. 5, the guard-enabled node 501 may be further configured for transferring the data packet to a second network according to compliance of the data packet with the one or more geographic location-dependent access control rules. Upon a determination that a data packet complies with a location-dependent ACR by the guard engine 101, the guard engine 101 may operate as an interface between multiple networks to facilitate the transfer of data packets. For example, the guard engine 101 may authorize a GDM 102 of the guard engine 101 to transfer the data packet from an offload engine associated with the command and control network 502 (e.g. $OE_1$) to an offload engine associated with the internal data processing network 504 of the guard-enabled node 501 (e.g. $OE_2$). The data packet may be retrieved from the offload engine by the internal data processing network 504 for processing (e.g. display of classified satellite imagery to a user via a user interface 505 of the guard-enabled node 501).

In a particular example of the above operations associated with the guard-enabled node 501, a guard-enabled node 501 may be a warfighter requiring classified information in special situations. The warfighter may be fitted with the GPS-enabled guard engine 101 configured to allow the warfighter to receive classified information only for the length of a mission and only when the warfighter is located within a specific geographic region. Such flexibility may negate the need to load new ACL to the guard engine as the warfighter moves between various locations as the GPS-enabled guard engine 101 may automatically filter incoming data packets as appropriate for a current location of the warfighter.

In another exemplary implementation, one or more guard-enabled nodes 501 (e.g. computing terminals) may be distributed throughout a command and control center having various geographic locations with varying levels of associated security. Each guard-enabled node 501 may be configured with a common ACL defining a common set of location-dependent ACRs. Each GPS-enabled guard engine 101 of each guard-enabled node 501 may be able to load or apply the ACRs according to its location within the command and control center.

While the above descriptions of the operations associated with the guard-enabled node 501 have been made with reference to receipt of data packets from the command and control network 502 for processing by the guard-enabled node 501, it is fully contemplated that such operations may also be applicable to scenarios where the guard-enabled node 501 may be generating data packets which may be transmitted to other guard-enabled nodes 501 or command and control networks 502. For example, a guard-enabled node 501 may be a warfighter configured to automatically report its GPS position to other guard-enabled nodes 501 or the command and control networks 502. It may be desirable that in some geographic areas, these position messages are not transmitted (e.g. during certain phases of a black operation). The guard engine 101 could be configured to apply ACRs which filter such GPS broadcast operations based on the warfighter's location.

The guard-enabled node 501 may be further configured for applying a geographic location-dependent tag to a data packet. For example, upon receipt of a data packet from a data source (e.g. the data processing network 504 of a guard-enabled node 501), the guard engine 101 of the guard-enabled node 501 may apply a location-dependent tag (e.g. a meta-data tag) derived from the location of the guard-enabled node 501 as determined by its GPS module. The data packet may then be forwarded on to another network node (e.g. a guard-enabled node 501 or the command and control network 502) via an offload engine. By tagging and binding data with a location and/or timestamp associated with the high-assurance core of the guard engine 101, downstream consumers of the data may have a higher degree of assurance that the tags are correct.

The guard-enabled node 501 may be further configured for reporting non-compliance of a data packet with a geographic location-dependent parameter as determined by the guard engine. For example, upon receipt of a data packet and application of a location-dependent ACR to the data packet, the guard engine 101 may determine that the guard-enabled node 501 is not within an authorized zone so as to access the data packet. In such a case, the guard engine 101 may return a notification to the source of the data packet indicating that the data packet was unable to be accessed by the guard-enabled node 501 because its geographic location was outside of the authorized geographic region defined by the ACR. Such reporting may serve to notify command and control services of the non-receipt of the data packet such that remedial measures may be taken to either retransmit the data packet with a lower security level or wait until the guard-enabled node 501 enters an authorized geographic region.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for routing of information between networks of differing security levels, comprising:
   receiving, from a first network having a first security classification, one or more data packets intended for transmission to a second network having a second security classification, via a first offload engine based on a first processor of a network node;
   determining a geographic location of the network node via a position sensor of the network node;
   applying one or more geographic location-dependent access control rules to the one or more data packets according to the geographic location via a guard engine of the network node, the one or more geographic location-dependent access control rules included in an access control list of the guard engine, the guard engine based on a second processor with intrinsic partitioning architecture and running at least one Multiple Independent Levels of Security (MILS)-certified operating system; and
   upon a determination by the guard engine that the one or more data packets comply with the one or more geographic location-dependent access control rules, transferring the one or more data packets from the first offload engine to a second offload engine associated with the second network by authorizing a guard data mover of the guard engine to transfer the one or more data packets from the first offload engine to the second offload engine, the guard data mover configured to provide at least one independent unidirectional data channel between the guard engine and the first offload engine.

2. The method of claim 1, further comprising:
   applying a geographic location-dependent tag corresponding to the geographic location to the one or more data packets.

3. The method of claim 1, wherein the upon determination by the guard engine that the one or more data packets comply with the one or more geographic location-dependent access control rules, transferring the one or more data packets from the first offload engine to a second offload engine associated with the second network by authorizing a first guard data mover of the guard engine to transfer the one or more data packets from the first offload engine to the second offload engine includes:
   preventing transfer of the one or more data packets from the first network to the second network upon a determination of non-compliance of the one or more data packets with the one or more geographic location-dependent access control rules; and
   reporting to the first network the non-compliance of the one or more data packets with the one or more geographic location-dependent access control rules.

4. The method of claim 1, wherein upon a determination by the guard engine that the one or more data packets comply with the one or more geographic location-dependent access control rules, transferring the one or more data packets from the first offload engine to a second offload engine associated with the second network by authorizing a guard data mover of the guard engine to transfer the one or more data packets from the first offload engine to the second offload engine, the guard data mover configured to provide at least one independent unidirectional data channel between the guard engine and the first offload engine includes:
   upon a determination by the guard engine that the one or more data packets comply with the one or more geographic location-dependent access control rules, transferring the one or more data packets from the first offload engine to the second offload engine housed on a third processor and associated with the second network by authorizing the guard data mover of the guard engine to transfer the one or more data packets from the first offload engine to the second offload engine, the guard data mover configured to provide the at least one independent unidirectional data channel between the guard engine and the first offload engine.

5. A non-transitory computer-readable medium having computer-executable code configured to program at least one computing device for routing of information between networks of differing security levels, comprising:

instructions for receiving, from a first network having a first security classification, one or more data packets intended for transmission to a second network having a second security classification, via a first offload engine housed on a first processor of a network node;

instructions for determining a geographic location of the network node via a position sensor of the network node;

instructions for applying one or more geographic location-dependent access control rules to the one or more data packets according to the geographic location via a guard engine of the network node, the one or more geographic location-dependent access control rules included in an access control list of the guard engine, the guard engine based on a second processor with intrinsic partitioning architecture and running at least one Multiple Independent Levels of Security (MILS)-certified operating system; and instructions for, upon a determination by the guard engine that the one or more data packets comply with the one or more geographic location-dependent access control rules, transferring the one or more data packets from the first offload engine to a second offload engine associated with the second network by authorizing a guard data mover of the guard engine to transfer the one or more data packets from the first offload engine to the second offload engine, the guard data mover configured to provide at least one independent unidirectional data channel between the guard engine and the first offload engine.

6. The non-transitory computer-readable medium of claim 5, further comprising:

instructions for applying a geographic location-dependent tag corresponding to the geographic location.

7. The non-transitory computer-readable medium of claim 5, wherein the instructions for, upon a determination by the guard engine that the one or more data packets comply with the one or more geographic location-dependent access control rules, transferring the one or more data packets from the first offload engine to a second offload engine associated with the second network by authorizing a first guard data mover of the guard engine to transfer the one or more data packets from the first offload engine to the second offload engine include:

instructions for preventing transfer of the one or more data packets from the first network to the second network upon a determination of non-compliance of the one or more data packets with the one or more geographic location-dependent access control rules; and reporting to the first network the non-compliance of the one or more data packets with the one or more geographic location-dependent access control rules.

8. The non-transitory computer-readable medium of claim 5, wherein instructions for, upon a determination by the guard engine that the one or more data packets comply with the one or more geographic location-dependent access control rules, transferring the one or more data packets from the first offload engine to a second offload engine associated with the second network by authorizing a guard data mover of the guard engine to transfer the one or more data packets from the first offload engine to the second offload engine; the guard data mover configured to provide at Least one independent unidirectional data channel between the guard engine and the first offload engine includes:

instructions for, upon a determination by the guard engine that the one or more data packets comply with the one or more geographic location-dependent access control rules, transferring the one or more data packets from the first offload engine to the second offload engine housed on a third processor and associated with the second network by authorizing the guard data mover of the guard engine to transfer the one or more data packets from the first offload engine to the second offload engine, the guard data mover configured to provide the at least one independent unidirectional data channel between the guard engine and the first offload engine.

9. A system for routing of information between networks of differing security levels, comprising:

a first network having a first security classification;

at least one second network having a second security classification;

at least one network node including:

a first offload engine housed on a first processor configured to receive one or more data packets from the first network;

at least one second offload engine associated with the at least one second network;

a first guard data mover (GDM) associated with the first offload engine; at least one position sensor configured to determine a geographic location of the at least one network node; and a guard engine including at least one access control list, the guard engine based on a second processor including intrinsic partitioning architecture and running at least one Multiple Independent Levels of Security (MILS)-certified operating system and configured to 1) apply to the one or more data packets one or more access control rules of the access control list, the one or more access control rules dependent on the geographic location and 2) transfer the one or more data packets from the first offload engine to the at least one second offload engine via the first GDM, based on the compliance of the one or more data packets with the one or more access control rules; the first GDM configured to provide at least one first independent unidirectional data channel between the guard engine and the first offload engine.

10. The system of claim 9, wherein:

the at least one network node includes at least one second GDM associated with the at least one second offload engine, the at least one second GDM configured to provide at least one second independent unidirectional data channel between the guard engine and the at least one second offload engine; and the guard engine is configured to transfer the one or more data packets from the first offload engine to the at least one second offload engine via the first GDM and the at least one second GDM, based on the compliance of the one or more data packets with the one or more access control rules.

11. The system of claim 9, wherein the guard engine is configured to:
   prevent transfer of the one or more data packets from the first network to the at least one second network upon a determination of non-compliance of the one or more data packets with the one or more access control rules; and
   report to the first network the non-compliance of the one or more data packets with the one or more geographic location-dependent access control rules.

12. The system of claim 9, wherein the at least one second offload engine is based on a third processor.

13. The system of claim 12, wherein the first processor and the third processor are coupled to the second processor and include at least one of an embedded processor and a Reduced Instruction Set Computer (RISC) processor.

* * * * *